(12) United States Patent
Kwon et al.

(10) Patent No.: US 9,618,352 B2
(45) Date of Patent: Apr. 11, 2017

(54) APPARATUS AND METHOD FOR CONTROLLING NAVIGATOR VIA SPEECH DIALOGUE

(71) Applicant: ELECTRONICS AND TELECOMMUNICATIONS RESEARCH INSTITUTE, Daejeon (KR)

(72) Inventors: Oh-Woog Kwon, Daejeon (KR); Young-Kil Kim, Daejeon (KR); Chang-Hyun Kim, Daejeon (KR); Seung-Hoon Na, Daejeon (KR); Yoon-Hyung Roh, Daejeon (KR); Young-Ae Seo, Daejeon (KR); Ki-Young Lee, Daejeon (KR); Sang-Keun Jung, Daejeon (KR); Sung-Kwon Choi, Daejeon (KR); Yun Jin, Daejeon (KR); Eun-Jin Park, Daejeon (KR); Jong-Hun Shin, Daejeon (KR); Jinxia Huang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/670,589

(22) Filed: Mar. 27, 2015

(65) Prior Publication Data
US 2015/0276424 A1    Oct. 1, 2015

(30) Foreign Application Priority Data

Mar. 27, 2014  (KR) .......................... 10-2014-0036094

(51) Int. Cl.
  *G10L 21/00*    (2013.01)
  *G01C 21/36*    (2006.01)
  *G10L 15/22*    (2006.01)

(52) U.S. Cl.
  CPC .......... *G01C 21/3608* (2013.01); *G10L 15/22* (2013.01); *G10L 2015/223* (2013.01)

(58) Field of Classification Search
  USPC .......................... 704/246, 247, 251, 252, 275
  See application file for complete search history.

(56) References Cited

U.S. PATENT DOCUMENTS

| | | | |
|---|---|---|---|
| 9,076,334 B2 * | 7/2015 | Schirmer | G01C 21/3626 |
| 2004/0102897 A1 * | 5/2004 | Watanabe | G01C 21/367 |
| | | | 701/454 |

(Continued)

FOREIGN PATENT DOCUMENTS

| | | |
|---|---|---|
| EP | 1 560 200 | 8/2005 |
| JP | 2008-64885 | 3/2008 |

(Continued)

*Primary Examiner* — Leonard Saint Cyr
(74) *Attorney, Agent, or Firm* — Staas & Halsey LLP (57) ABSTRACT

An apparatus and method for controlling a navigator are disclosed herein. The apparatus includes a natural voice command acquisition unit, an information acquisition unit, a speech language understanding unit, a related information extraction unit, and a dialog management control unit. The natural voice command acquisition unit obtains a natural voice command from a user. The information acquisition unit obtains vehicle data including information about the operation of the navigator and information about the state of the vehicle. The speech language understanding unit converts the natural voice command into a user intention that can be understood by a computer. The related information extraction unit extracts related information that corresponds to the user intention. The dialog management control unit generates a response to the natural voice command based on (Continued)

the related information, the user intention and a dialog history, and controls the navigator in accordance with the conversation response.

10 Claims, 7 Drawing Sheets

(56) References Cited

U.S. PATENT DOCUMENTS

| | | | |
|---|---|---|---|
| 2005/0171694 A1* | 8/2005 | Schirmer | G01C 21/3626 |
| | | | 701/411 |
| 2005/0267759 A1 | 12/2005 | Jeschke et al. | |
| 2008/0177541 A1* | 7/2008 | Satomura | 704/251 |
| 2011/0106430 A1* | 5/2011 | Schirmer | G01C 21/3626 |
| | | | 701/533 |
| 2015/0160019 A1* | 6/2015 | Biswal | G01C 21/26 |
| | | | 701/1 |
| 2016/0011854 A1* | 1/2016 | Furumoto | G06F 3/16 |
| | | | 704/249 |

FOREIGN PATENT DOCUMENTS

| | | |
|---|---|---|
| KR | 10-2005-0077806 | 8/2005 |
| KR | 10-2006-0057726 | 5/2006 |
| KR | 10-2007-0061188 | 6/2007 |
| KR | 10-2010-0041492 | 4/2010 |

\* cited by examiner

APPARATUS AND METHOD FOR CONTROLLING NAVIGATOR VIA SPEECH DIALOGUE

CROSS-REFERENCE TO RELATED APPLICATION

This application claims the benefit of Korean Patent Application No. 10-2014-0036094, filed Mar. 27, 2014, which is hereby incorporated by reference herein in its entirety.

BACKGROUND

1. Technical Field

The present invention relates generally to a technology in which a user controls a navigator included in a vehicle via speech dialogue and, more particularly, to a technology for controlling a navigator via speech dialogue, in which a user may efficiently and conveniently use a navigator while driving by performing a speech dialogue using information about the operation of the navigator and information about a vehicle.

2. Description of the Related Art

In general, a speech dialogue system is an apparatus that stores commands of a driver, determines a driver's intention, more efficiently deals with a driver's demand based on a conversational situation, and then executes the driver's demand, as in the operation of receiving a simple natural voice command and controlling an electronic device.

A conventional speech dialogue interface for a vehicle uses a method of analyzing a natural voice command regardless of the current situation of a vehicle and transferring the analyzed command to an electronic device to be controlled. However, if commands can be exchanged between a driver and an electronic device in response to natural voice commands in a conversation form or if the current situation of a vehicle is determined and then natural voice commands can be processed, more appropriate measures can be taken. When a common speech dialogue system is used, a dialogue history composed of speech dialogues between a driver and an electronic device can be recorded and a situation can be understood. It is difficult for a vehicle electronic device to efficiently execute natural voice commands because the electronic device is frequently driven in association with speech dialogue in the state in which it has been controlled by existing various interfaces. For example, it is assumed that a driver sets a destination using a touch interface before he or she starts a vehicle using a navigator for the vehicle and is then provided with route guidance. If the driver utters "Search for a close gas station" as a natural voice command in order to search for a gas station, a speech dialogue system must perform conversation with the driver so that a gas station near a destination route can be searched for and then the found gas station can be set as a stop. In contrast, when the same natural voice command is uttered without setting a destination, a gas station near the place where the vehicle is placed must be searched for and then a new destination must be set. As shown in the example, in order for a vehicle speech dialogue system using a speech dialogue interface to appropriately operate, information about an electronic device being driven in response to a request from a driver and information about the vehicle are required, and also the speech dialogue system must access, interpret and use the information. When external information service is accessed via an electronic device within a vehicle, a user is enabled to obtain only useful and required information based on information about the movement and location of the vehicle. Furthermore, since various pieces of information are previously known via the situation information, the number of interactions between a driver and an electronic device can be reduced, and thus information desired by the driver can be more rapidly transferred.

Accordingly, in order to efficiently execute a natural voice command between a user and a navigator for a vehicle, there is an urgent need for a navigator control technology using speech dialogues, which is capable of processing natural voice commands based on information about the operation of the navigator and information about the vehicle. In connection with this, Korean Patent Application Publication No. 10-2010-0041492A discloses a technology related to "A dialogue type vehicle diagnosis system".

SUMMARY

At least one embodiment of the present invention is intended to enable a navigator for a vehicle to more efficiently execute a command via speech dialogue with a user using information about the operation of the navigator and information about the vehicle.

At least one embodiment of the present invention is intended to allow a user to simply manipulate a navigator via voice so that the user can concentrate his or her attention on driving while using the navigator.

At least one embodiment of the present invention is intended to more perfectly execute a user command by deriving information required to execute a command via speech dialogue with a user.

In accordance with an aspect of the present invention, there is provided an apparatus for controlling a navigator, including a natural voice command acquisition unit configured to obtain a natural voice command from a user; an information acquisition unit configured to obtain vehicle data including information about the operation of the navigator installed in the vehicle of the user and information about the state of the vehicle; a speech language understanding unit configured to convert the natural voice command into a user intention that can be understood by a computer; a related information extraction unit configured to extract related information that belongs to the vehicle data and that corresponds to the user intention; and a dialogue management control unit configured to generate a response to the natural voice command based on the related information, the user intention and a dialogue history and control the navigator in accordance with the response.

The dialogue management control unit may include a dialogue processing knowledge acquisition unit configured to convert the related information into dialogue processing knowledge in order to generate the response using the related information; and a dialogue management unit configured to store and manage a dialogue history and the dialogue processing knowledge for generating the response.

The dialogue management control unit may generate control data used for control corresponding to the response, may convert the control data into a navigator execution command form, and may send the converted data to the navigator.

The dialogue management unit may summarize the dialogue history and display the summarized history to the user.

The apparatus may further include a control result output unit configured to output a control result corresponding to the control data in one or more of voice and display forms.

The apparatus may further include an external service provision unit configured to provide external service information in order to process the natural voice command.

The related information extraction unit may extract the related information by considering a route guidance function provided by the navigator.

In accordance with another aspect of the present invention, there is provided a method of controlling a navigator, including obtaining a natural voice command from a user; obtaining vehicle data including information about the operation of the navigator installed in the vehicle of the user and information about the state of the vehicle; converting the natural voice command into a user intention that can be understood by a computer, and extracting related information that belongs to the vehicle data and that corresponds to the user intention; and generating a response to the natural voice command based on the related information, the user intention and a dialogue history, and controlling the navigator in accordance with the response.

Controlling the navigator may include converting the related information into dialogue processing knowledge in order to generate the response using the related information; and storing and managing a dialogue history and the dialogue processing knowledge for generating the response.

Controlling the navigator may include generating control data used for control corresponding to the response; and the control data is converted into a navigator execution command form and sent to the navigator.

Storing and managing the dialogue history and the dialogue processing knowledge may include summarizing the dialogue history and displaying the summarized history to the user.

The method may further include outputting a control result corresponding to the control data in one or more of voice and display forms.

The method may further include providing external service information in order to process the natural voice command.

Extracting the related information may include extracting the related information by considering a route guidance function provided by the navigator.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

Embodiments of the present invention are described in detail below with reference to the accompanying drawings.

Figure 1:
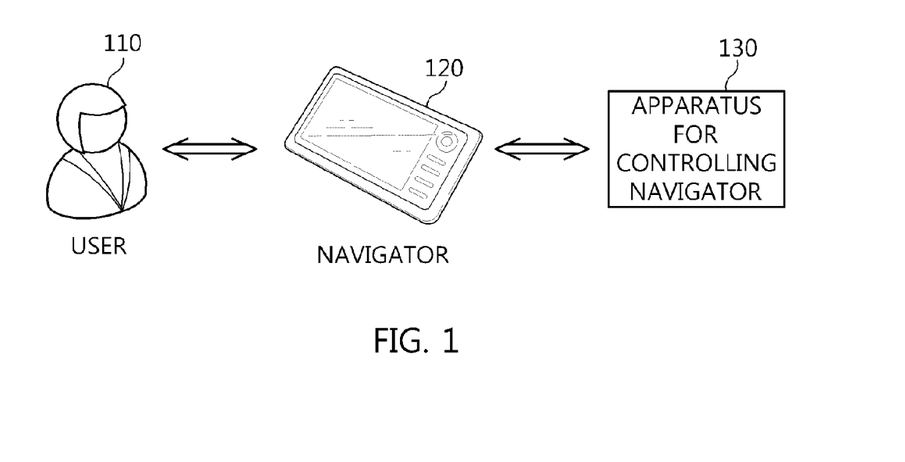
FIG. 1 is a diagram illustrating a system for controlling a navigator via speech dialogue according to an embodiment of the present invention.

FIG. 1 is a diagram illustrating a system for controlling a navigator via speech dialogue according to an embodiment of the present invention.

Referring to FIG. 1, the system for controlling a navigator via speech dialogue according to the present embodiment may include a user 110, a navigator 120, and an apparatus 130 for controlling a navigator.

In this system for controlling a navigator, if the user 110 requests route guidance or requests required information to be searched for via a natural voice command while driving, the apparatus 130 for controlling a navigator may obtain the natural voice command from the user 110 via the interface of the navigator 120.

Furthermore, the apparatus 130 for controlling a navigator may obtain vehicle data, including information about the operation of the navigator 120 installed in the vehicle of the user and information about the state of the vehicle. For example, the apparatus 130 for controlling a navigator may obtain information about the operation of the navigator, such as information about whether a final destination has been set, information about whether a stop has been set, information about whether an avoidance path has been set, and information about the type of route guidance, or information about the state of the vehicle, such as information about the current location and speed of the vehicle, information about the refueling state of the vehicle, and information about other checking states of the vehicle.

Furthermore, the apparatus 130 for controlling a navigator may convert the natural voice command into a user intention that can be understood by a computer.

Furthermore, the apparatus 130 for controlling a navigator may extract related information that belongs to vehicle data and that corresponds to the user intention.

In this case, the apparatus 130 for controlling a navigator may extract the related information by considering a route guidance function provided by the navigator 120.

Furthermore, the apparatus 130 for controlling a navigator may generate a response to a natural voice command based on the related information, the user intention and a dialogue history, and may control the navigator 120 in accordance with the response.

In this case, the related information may be converted into dialogue processing knowledge so that it is used to generate the response.

In this case, a dialogue history and dialogue processing knowledge for generating the response may be stored and managed.

In this case, control data used for control corresponding to the response may be generated. The control data may be converted into a navigator execution command form and transferred to the navigator 120.

In this case, the dialogue history may be summarized and displayed to the user 110. By summarizing and displaying the dialogue history, the natural voice command of the user 110 and the response of the apparatus 130 for controlling a navigator according to the natural voice command of the user 110 can be displayed on a screen so that the user 110 may check whether his or her intention has been correctly transferred to the apparatus 130 for controlling a navigator.

Furthermore, the apparatus 130 for controlling a navigator may output a control result corresponding to the control data in one or more of voice and display forms.

Furthermore, the apparatus 130 for controlling a navigator may provide external service information if the external service information is required to interpret and process a natural voice command.

The system for controlling a navigator is advantageous in that a driver can concentrate his or her attention on driving and an accident can be prevented because the driver does not need to manually manipulate the navigator in order to search for required information while driving and also service is provided via voice.

Figure 2:
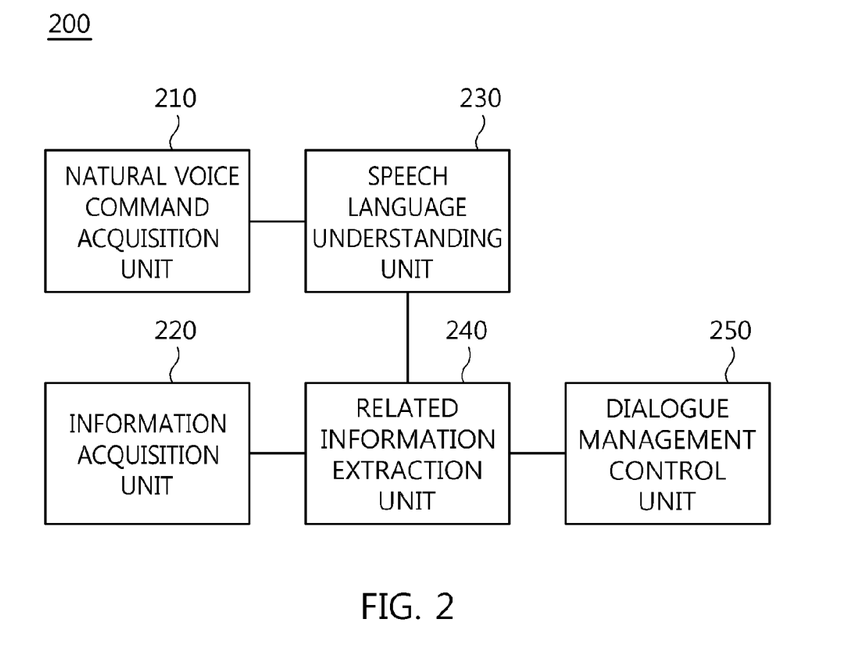
FIG. 2 is a block diagram illustrating an apparatus for controlling a navigator according to an embodiment of the present invention.

FIG. 2 is a block diagram illustrating an apparatus 200 for controlling a navigator according to an embodiment of the present invention.

Referring to FIG. 2, the apparatus 200 for controlling a navigator according to the present embodiment may include a natural voice command acquisition unit 210, an information acquisition unit 220, a speech language understanding unit 230, a related information extraction unit 240, and a dialogue management control unit 250.

The natural voice command acquisition unit 210 may obtain a natural voice command from a user. For example, when a natural voice command is to be obtained using a navigator installed in the vehicle of a user, the user allows the navigator to recognize a specific signal that requests a speech dialogue from the apparatus for controlling a navigator, and then the natural voice command acquisition unit 210 may obtain the natural voice commands uttered by the user.

The information acquisition unit 220 may obtain vehicle data, including information about the operation of a navigator installed in the vehicle of a user and information about the state of the vehicle. For example, the information acquisition unit 220 may obtain information about the operation of the navigator, such as information about whether a final destination has been set, information about whether a stop has been set, information about whether an avoidance path has been set, and information about the type of route guidance, or information about the state of the vehicle, such as information about the current location and speed of the vehicle, information about the refueling state of the vehicle, and information about other checking states of the vehicle.

The speech language understanding unit 230 may convert a natural voice command into a user intention that can be understood by a computer. The speech language understanding unit 230 may recognize a natural voice command obtained from a user, may convert the voice into a text sentence, and may recognize the user intention which is a semantic structure interpretable by a computer in the converted text sentence.

The related information extraction unit 240 may extract related information that belongs to vehicle data and that corresponds to a user intention. For example, if a natural voice command is a command for search for a specific destination and route guidance, the related information extraction unit 240 may extract information about a currently set destination via the operation information, or may extract related information regarding whether a vehicle is able to move to the destination based on the refueling state of the vehicle via the vehicle information.

The related information extraction unit 240 may extract the related information by considering a route guidance function provided by a navigator.

The dialogue management control unit 250 may generate a response to a natural voice command based on the related information, the user intention and a dialogue history, and may control a navigator in accordance with the response.

In this case, the dialogue management control unit 250 may convert the related information into dialogue processing knowledge in order to generate the response using the related information.

In this case, the dialogue management control unit 250 may store and manage a dialogue history and dialogue processing knowledge for generating the response.

In this case, the dialogue management control unit 250 may generate control data used for control corresponding to the response, may convert the control data into a navigator execution command form, and may send the converted data to the navigator.

In this case, the dialogue management control unit 250 may summarize the dialogue history and display the summarized history to the user. Since the dialogue history is summarized and displayed, the natural voice command of the user and the response of the apparatus for controlling a navigator in response to the natural voice command of the user are displayed on a screen, so that the user may check whether his or her intention has been correctly transferred to the apparatus for controlling a navigator.

Furthermore, although not illustrated in FIG. 2, the apparatus 200 for controlling a navigator may output a control result corresponding to the control data in one or more of voice and display forms. For example, if the natural voice command of a user is related to route guidance, the apparatus 200 for controlling a navigator may provide the guidance of a route to a destination as a control result in the form of voice and display. If the natural voice command of a user is a search for information, the apparatus 200 for controlling a navigator may output the content of information retrieved as a control result in the form of voice and display.

Furthermore, although not illustrated in FIG. 2, the apparatus 200 for controlling a navigator may provide external service information if the external service information is required to interpret and process a natural voice command.

A driver can control a navigator or obtain required information via only voice while driving via the apparatus 200 for controlling a navigator. Accordingly, advantages arise in that inconvenience attributable to the manual manipulation of the navigator while driving can be overcome and the danger of a traffic accident attributable to a manual manipulation can be reduced.

Figure 3:
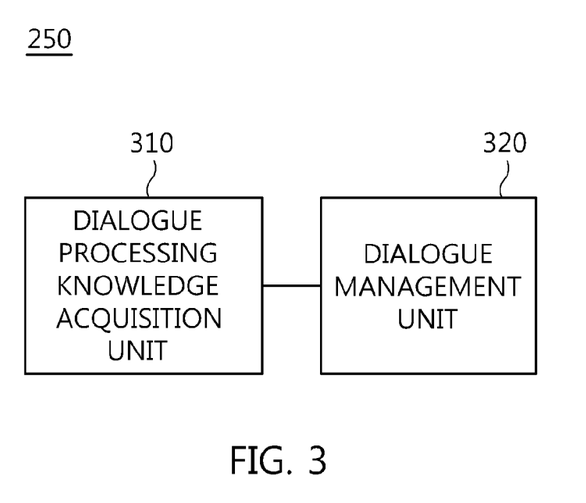
FIG. 3 is a block diagram illustrating a dialogue management control unit according to an embodiment of the present invention.

FIG. 3 is a block diagram illustrating the dialogue management control unit 250 according to an embodiment of the present invention.

Referring to FIG. 3, the dialogue management control unit 250 according to the present embodiment may include a dialogue processing knowledge acquisition unit 310, and a dialogue management unit 320.

The dialogue processing knowledge acquisition unit 310 may convert related information, extracted from vehicle data, into dialogue processing knowledge in order to generate a response using the related information. The related information extracted from the vehicle data is not suitable for a form that is used for the apparatus for controlling a navigator to generate the response in order to perform a speech dialogue. Accordingly, the dialogue processing knowledge acquisition unit 310 may convert the extracted related information into a dialogue processing knowledge form that is suitable for generating the response.

The dialogue management unit 320 may store and manage a dialogue history and dialogue processing knowledge for generating a response. In order to generate a response suitable for a user intention, a dialogue history which has been progressed until the present time and processing knowledge converted from related information may be required. Accordingly, a speech dialogue history between a user and the apparatus for controlling a navigator and dialogue processing knowledge related to the speech dialogue history may be stored and managed.

Figure 4:
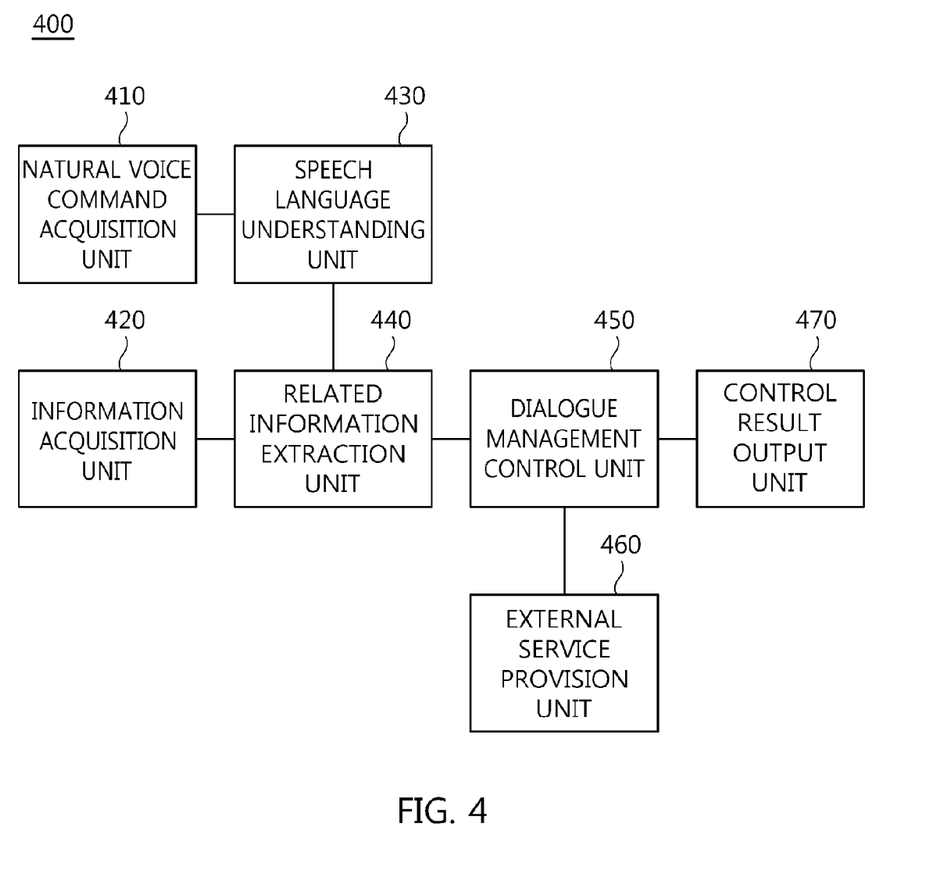
FIG. 4 is a block diagram illustrating an apparatus for controlling a navigator according to another embodiment of the present invention.

FIG. 4 is a block diagram illustrating an apparatus for controlling a navigator according to another embodiment of the present invention.

Referring to FIG. 4, the apparatus for controlling a navigator 400 according to the present embodiment may include a natural voice command acquisition unit 410, an information acquisition unit 420, a speech language understanding unit 430, a related information extraction unit 440, a dialogue management control unit 450, an external service provision unit 460, and a control result output unit 470.

The natural voice command acquisition unit 410 may obtain a natural voice command from a user. For example, if a natural voice command is to be obtained using a navigator installed in the vehicle of a user, the user may allow the navigator to recognize a specific signal that requests a speech dialogue from the apparatus for controlling a navigator, and then the natural voice command acquisition unit 410 may obtain contents spoken by the user in a natural voice command form.

The information acquisition unit 420 may obtain vehicle data, including information about the operation of a navigator installed in the vehicle of a user and information about the state of the vehicle. For example, The information acquisition unit 420 may obtain information about the operation of the navigator, such as information about whether a final destination has been set, information about whether a stop has been set, information about whether an avoidance path has been set, and information about the type of route guidance, or information about the state of the vehicle, such as information about the current location and speed of the vehicle, information about the refueling state of the vehicle, and information about other checking states of the vehicle.

The speech language understanding unit 430 may convert a natural voice command into a user intention that can be understood by a computer. The speech language understanding unit 430 may recognize a natural voice command obtained from a user, may convert the voice into a text sentence, may check a user intention in the converted text sentence, and may convert the user intention into the semantic structure of user utterance so that a computer may interpret the semantic structure.

The related information extraction unit 440 may extract related information that belongs to vehicle data and that corresponds to a user intention. For example, if a natural voice command is a command for a search for a specific destination and for route guidance, the related information extraction unit 440 may extract information about a currently set destination via driving information, or may extract related information regarding whether a vehicle is able to move to the destination based on the refueling state of the vehicle via vehicle information.

The related information extraction unit 440 may extract the related information by considering a route guidance function provided by a navigator.

The dialogue management control unit 450 may generate a response to a natural voice command based on the related information, the user intention and a dialogue history, and may control a navigator in accordance with the response.

In this case, the dialogue management control unit 450 may convert the related information into dialogue processing knowledge in order to generate the response using the related information.

In this case, the dialogue management control unit 450 may store and manage a dialogue history and dialogue processing knowledge for generating the response.

In this case, the dialogue management control unit 450 may generate control data used for control corresponding to the response, may convert the control data into a navigator execution command form, and may send the converted data to the navigator.

In this case, the dialogue management control unit 450 may summarize the dialogue history and display the summarized history to the user. Since the dialogue history is summarized and displayed, the natural voice command of the user and the response of the apparatus for controlling a navigator in response to the natural voice command of the user are displayed on a screen, so that the user may check whether his or her intention has been correctly transferred to the apparatus for controlling a navigator.

The external service provision unit 460 may provide external service information if the external service information is required to interpret and process a natural voice command.

The control result output unit 470 may output a control result corresponding to control data in one or more of voice and display forms. For example, if the natural voice command of a user is related to route guidance, the control result output unit 470 may provide the guidance of a route to a destination as a control result in the form of voice and display. If the natural voice command of a user is a search for information, the control result output unit 470 may output the content of information retrieved as a control result in the form of voice and display.

Figure 5:
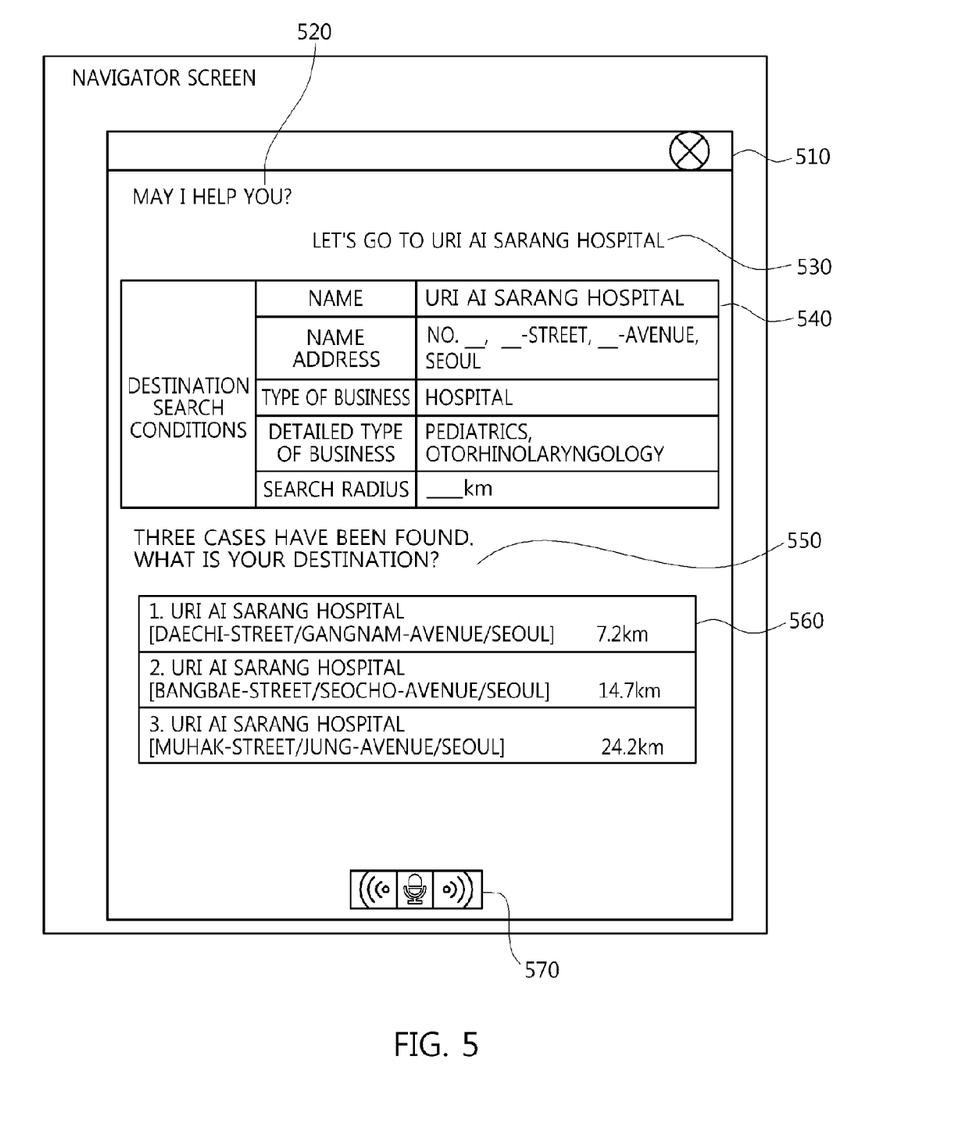
FIG. 5 is a diagram illustrating the summary output screen of the apparatus for controlling a navigator via speech dialogue according to an embodiment of the present invention.

FIG. 5 is a diagram illustrating the summary output screen of the apparatus for controlling a navigator via speech dialogue according to an embodiment of the present invention.

Referring to FIG. 5, the summary output screen of the apparatus for controlling a navigator via speech dialogue according to the present embodiment may include speech dialogue contents 520, 530, and 550 between a user and the apparatus for controlling a navigator and the processed contents 540 and 560 of the apparatus for controlling a navigator based on speech dialogues in a summary output window 510.

In order to obtain the natural voice command of a user, first, the apparatus for controlling a navigator may activate a speech dialogue icon 570 and output the speech dialogue content 520.

Thereafter, as in the speech dialogue content 530, the user may perform a speech dialogue via natural voice command "Let's go to Uri Ai Sarang Hospital."

In this case, the user may narrow a range by making a speech dialogue, for example, the speech dialogue "the hospital placed at xx Street", because there may be many destinations having names similar or identical to the name "Uri Ai Sarang Hospital."

Furthermore, even when some destinations have been found based on the same name, the processed content 560 is output so that the user can make a speech dialogue, such as "Please select pediatrics."

Figure 6:
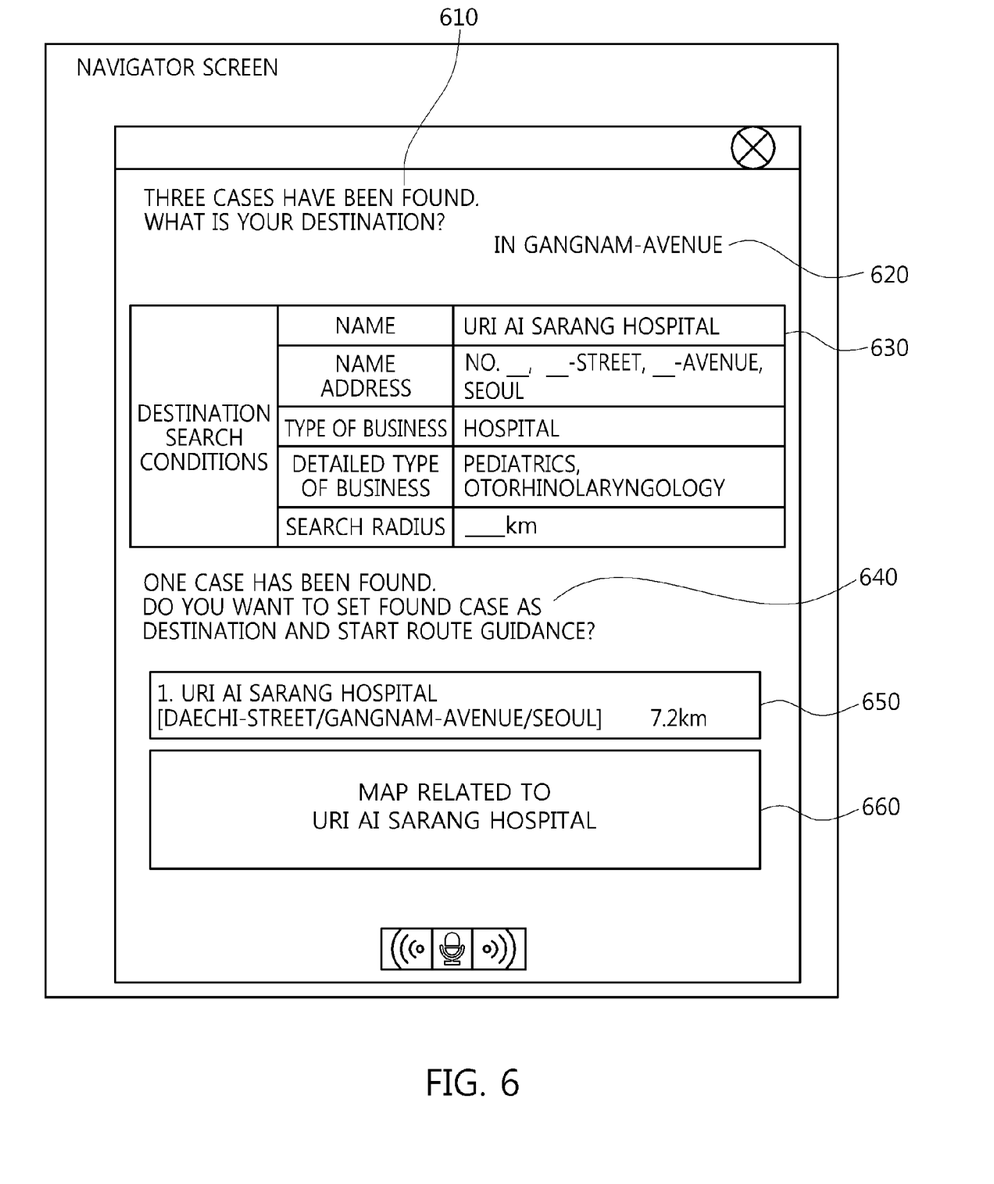
FIG. 6 is a diagram illustrating the summary output screen of the apparatus for controlling a navigator via speech dialogue according to another embodiment of the present invention.

FIG. 6 is a diagram illustrating the summary output screen of the apparatus for controlling a navigator via speech dialogue according to another embodiment of the present invention.

Referring to FIG. 6, the summary output screen of the apparatus for controlling a navigator via speech dialogue according to another embodiment of the present invention may include speech dialogue contents 610, 620, and 640 between a user and the apparatus for controlling a navigator, the processed contents 630 and 650 of the apparatus for controlling a navigator according to speech dialogues, and an information provision screen 660 according to the processed contents.

The apparatus for controlling a navigator may obtain the natural voice command of a user, may perform speech dialogue, and may then output the speech dialogue content 610 so that the user may perform the speech dialogue "in Gangnam-gu" as in the speech dialogue content 620.

As described above, processing most appropriate for a command can be performed because the range of information for performing the natural voice command of a user is narrowed through speech dialogues with the user.

Furthermore, information required by a user, such as the information provision screen 660, can be displayed and provided depending on the type of natural voice command. Such information may be a map for route guidance or an image and video of information required by a user.

Figure 7:
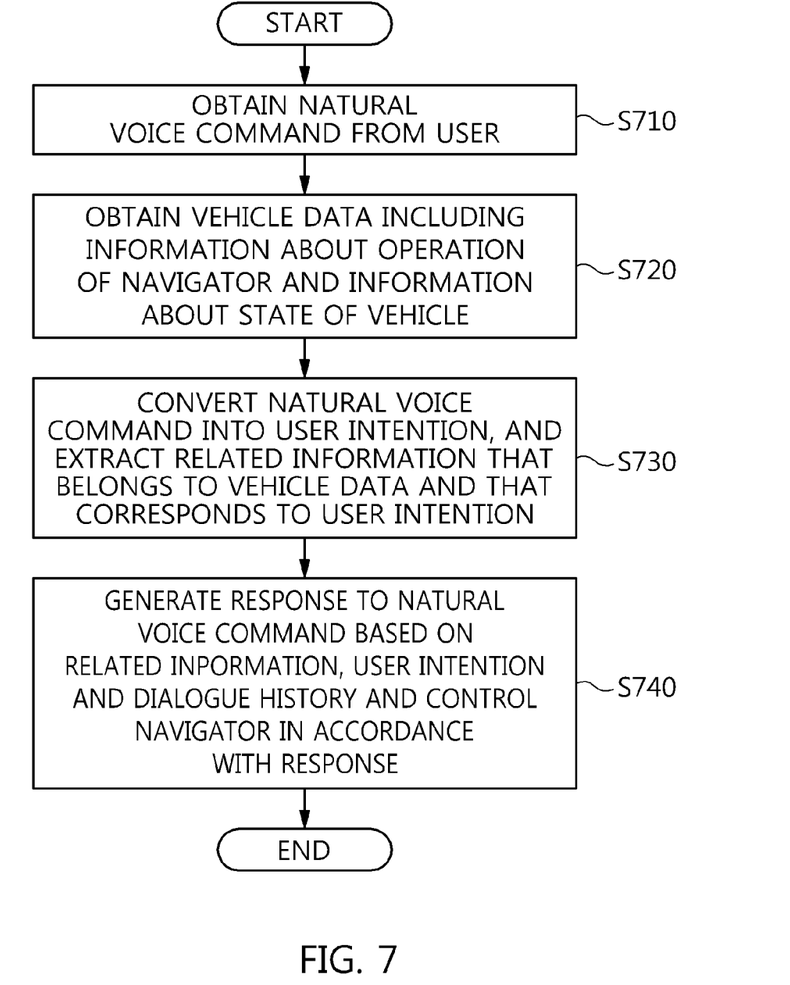
FIG. 7 is a flowchart illustrating a method of controlling a navigator according to an embodiment of the present invention.

FIG. 7 is a flowchart illustrating a method of controlling a navigator according to an embodiment of the present invention.

Referring to FIG. 7, in the method of controlling a navigator according to an embodiment of the present invention, a natural voice command may be obtained from a user at step S710. For example, if a natural voice command is to be obtained using a navigator installed in the vehicle of a user, when the user allows the navigator to recognize a specific signal that requests a speech dialogue from the apparatus for controlling a navigator, contents spoken by the user may be obtained as a natural voice command.

Thereafter, vehicle data including information about the operation of a navigator installed in the vehicle of the user and information about the state of the vehicle may be obtained at step S720. For example, information about the operation of the navigator, such as information about whether a final destination has been set, information about whether a stop has been set, information about whether an avoidance path has been set, and information about the type of route guidance, or information about the state of the vehicle, such as information about the current location and speed of the vehicle, information about the refueling state of the vehicle, and information about other checking states of the vehicle, may be obtained.

Thereafter, the natural voice command may be converted into a user intention that can be understood by a computer, and related information that belongs to the vehicle data and that corresponds to the user intention may be extracted at step S730. For example, if a natural voice command is a command for a search for a specific destination and for route guidance, information about a currently set destination may be extracted via driving information or related information regarding whether a vehicle is able to move to the destination may be extracted based on the refueling state of the vehicle via vehicle information.

In this case, after the natural voice command obtained from the user is recognized, a corresponding voice may be converted into a text sentence, and the text sentence may be converted into a semantic structure of user utterance so that a computer may interpret the semantic structure.

In this case, the related information may be extracted by considering a route guidance function provided by the navigator.

Thereafter, a response to the natural voice command may be generated based on the related information, the user intention and a dialogue history, and the navigator may be controlled in accordance with the response at step S740.

In this case, the related information may be converted into dialogue processing knowledge in order to generate the response using the related information.

In this case, a dialogue history and dialogue processing knowledge for generating the response may be stored and managed.

In this case, control data used for control corresponding to the response may be generated, and the control data may be converted in a navigator execution command form and transferred to the navigator.

In this case, the dialogue history may be summarized and displayed to the user. Since the dialogue history is summarized and displayed, the natural voice command of the user and the response of the apparatus for controlling a navigator according to the natural voice command of the user are displayed on a screen, so that the user may check whether his or her intention has been correctly transferred to the apparatus for controlling a navigator.

Furthermore, although not illustrated in FIG. 7, the method of controlling a navigator may include outputting a control result corresponding to the control data in one or more of voice and display forms. For example, if the natural voice command of a user is related to route guidance, the guidance of a route to a destination may be provided as a control result in the form of voice and display. If the natural voice command of a user is a search for information, the content of information retrieved as a control result may be output in the form of voice and display.

Furthermore, although not illustrated in FIG. 7, the method of controlling a navigator may include providing external service information if the external service information is required to interpret and process a natural voice command.

Accordingly, the driver of a vehicle can more concentrate his or her attention on driving because he or she can perform voice control, for example, in order to control the navigator of the vehicle or obtain required information via only voice using the method of controlling a navigator.

Figure 8:
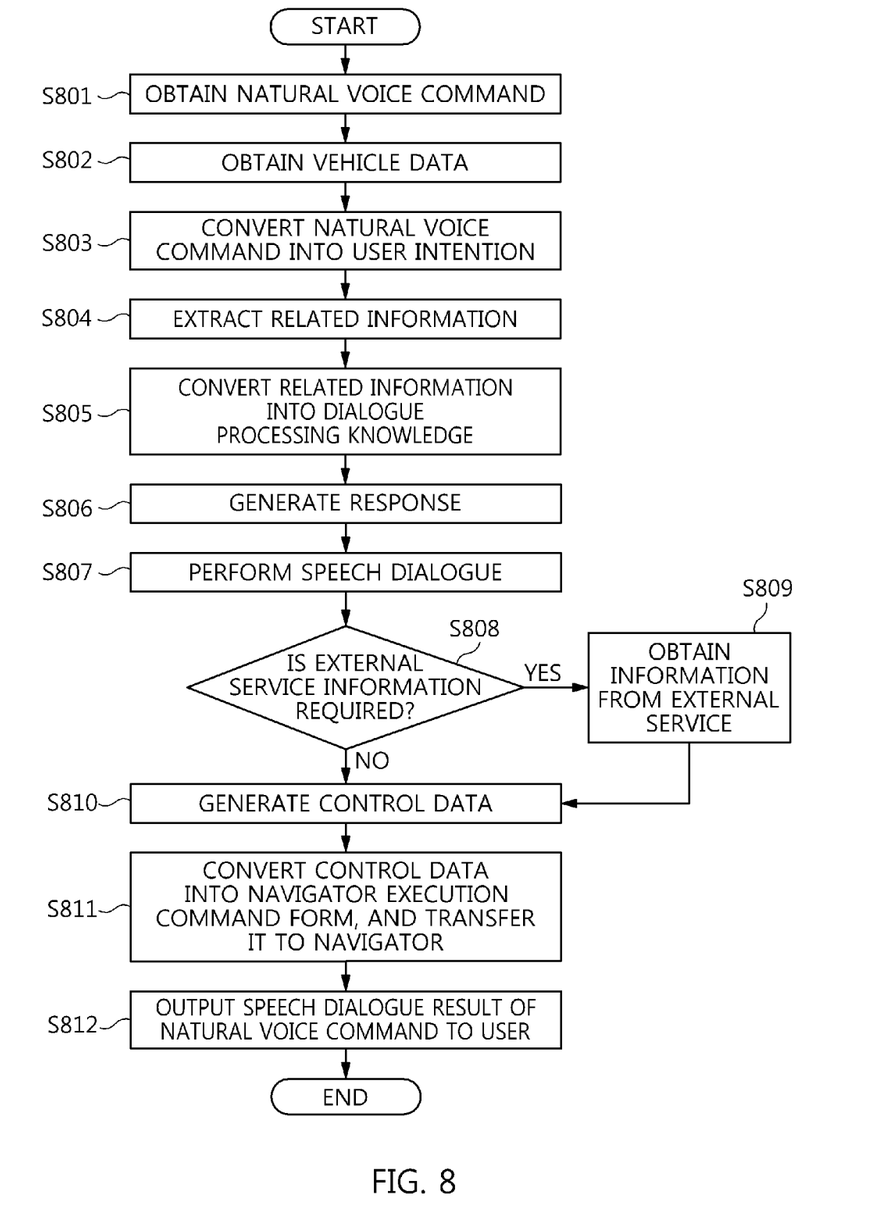
FIG. 8 is a detailed flowchart illustrating a method of controlling a navigator according to an embodiment of the present invention.

FIG. 8 is a detailed flowchart illustrating a method of controlling a navigator according to an embodiment of the present invention.

Referring to FIG. 8, in the method of controlling a navigator according to the present embodiment, first, a natural voice command may be obtained at step S801. When a user performs the natural voice command via a navigator installed in a vehicle while driving, the apparatus for controlling a navigator may obtain the natural voice command of the user.

Thereafter, vehicle data including information about the operation of the navigator installed in the vehicle and information about the state of the vehicle may be obtained at step S802.

Thereafter, the natural voice command may be converted into a user intention that can be understood by a computer at step S803.

Related information that belongs to the vehicle data and that corresponds to the user intention may be extracted at step S804.

The extracted related information may be converted into dialogue processing knowledge in order to generate a response using the extracted related information at step S805.

The response to the natural voice command may be generated based on dialogue processing knowledge converted from the related information, the user intention and a dialogue history at step S806.

A speech dialogue with the user may be performed using the generated response at step S807. A speech dialogue in a subsequent step may be derived by making the response to the utterance of the user using the dialogue processing knowledge, into which the information about the operation of the navigator installed in the vehicle and the information about the state of the vehicle have been converted, and existing conversation histories. A system control method corresponding to a user request may be searched for via the speech dialogue, and then a speech dialogue with the user may be performed.

In this case, whether external service information is required to process the natural voice command of the user may be determined at step S808.

If, as a result of the determination at step S808, it is determined that the external service information is required, information may be obtained from an external service at step S809. Control data used for controlling the navigator may be generated using the obtained external service information and a speech dialogue result at step S810.

If, as a result of the determination at step S808, it is determined that the external service information is not required, control data used for controlling the navigator may be generated using a speech dialogue result at step S810.

The control data may be converted into a navigator execution command form executable by the navigator and transferred to the navigator at step S811.

Thereafter, the speech dialogue result of the natural voice command may be output to the user at step S812.

As described above, a navigator for a vehicle can more efficiently perform a command via speech dialogue with a user using information about the operation of the navigator and information about the vehicle.

Furthermore, the present invention can simply control a navigator via voice so that a user can concentrate his or her attention on driving while using the navigator.

Furthermore, in accordance with the present invention, a natural voice command can be executed more perfectly because information required to execute a command is derived via speech dialogue with a user.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for controlling a navigator, comprising:
at least one processor to:
obtain a natural voice command from a user;
obtain vehicle data including information about an operation of the navigator installed in a vehicle of the user and information about a state of the vehicle, wherein the information about the operation of the navigator includes one or more of information about whether a final destination has been set, information about whether a stop has been set, information about whether an avoidance path has been set, and information about a type of route guidance;
convert the natural voice command into a user intention understandable by a computer;
extract related information that belongs to the vehicle data, the related information belonging to the vehicle data being determined to correspond to the user intention;
provide external service information in order to process the natural voice command;
generate control data corresponding to a response to the natural voice command based on the related information, the user intention and a dialogue history, so as to control the navigator to interact with the user by responding to the natural voice command in accordance with the response;
summarize the dialogue history; and
display the summarized dialogue history to the user.

2. The apparatus of claim 1, wherein the at least one processor converts the related information into dialogue processing knowledge in order to generate the response using the related information, and
stores and manages the dialogue history and the dialogue processing knowledge for generating the response.

3. The apparatus of claim 2, wherein the at least one processor converts the control data into a navigator execution command form, and sends the converted data to the navigator.

4. The apparatus of claim 3, wherein the at least one processor outputs a control result corresponding to the control data in one or more of voice and display forms.

5. The apparatus of claim 1, wherein the at least one processor extracts the related information by considering a route guidance function provided by the navigator.

6. A method of controlling a navigator, comprising:
obtaining a natural voice command from a user;
obtaining vehicle data including information about an operation of the navigator installed in a vehicle of the user and information about a state of the vehicle, wherein the information about the operation of the navigator includes one or more of information about whether a final destination has been set, information about whether a stop has been set, information about whether an avoidance path has been set, and information about a type of route guidance;
converting the natural voice command into a user intention understandable by a computer, and extracting related information that belongs to the vehicle data, the related information belonging to the vehicle data being determined to correspond to the user intention;
providing external service information in order to process the natural voice command;

generating control data corresponding to a response to the natural voice command based on the related information, the user intention and a dialogue history so as to control the navigator to interact with the user by responding to the natural voice command in accordance with the response; and summarizing the dialogue history and displaying the summarized dialogue history to the user.

7. The method of claim 6, wherein controlling the navigator comprises:

converting the related information into dialogue processing knowledge in order to generate the response using the related information; and storing and managing the dialogue history and the dialogue processing knowledge for generating the response.

8. The method of claim 7, wherein:

the control data is converted into a navigator execution command form and sent to the navigator.

9. The method of claim 8, further comprising outputting a control result corresponding to the control data in one or more of voice and display forms.

10. The method of claim 6, wherein extracting the related information comprises extracting the related information by considering a route guidance function provided by the navigator.

* * * * *